(12) United States Patent
Hasegawa et al.

(10) Patent No.: US 7,121,378 B2
(45) Date of Patent: Oct. 17, 2006

(54) TRANSFER RATIO VARYING APPARATUS

(75) Inventors: Isao Hasegawa, Seto (JP); Osamu Watanabe, Okazaki (JP); Motoyasu Yamamori, Nagoya (JP); Morihiro Matsuda, Toyota (JP); Shoichi Shono, Aichi-ken (JP); Masatoshi Nakatsu, Susono (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/694,866

(22) Filed: Oct. 29, 2003

(65) Prior Publication Data

US 2004/0093138 A1 May 13, 2004

(30) Foreign Application Priority Data

Oct. 29, 2002 (JP) ............................. 2002-314760

(51) Int. Cl.
*B62D 5/00* (2006.01)
(52) U.S. Cl. ....................... 180/444; 180/443
(58) Field of Classification Search ................ 180/443, 180/444, 446; 74/388 PS, 425
See application file for complete search history.

(56) References Cited

U.S. PATENT DOCUMENTS

| | | | | |
|---|---|---|---|---|
| 4,741,408 A * | 5/1988 | Bausch et al. | ............... | 180/443 |
| 5,226,498 A * | 7/1993 | Gutkowski et al. | ......... | 180/444 |
| 5,503,240 A * | 4/1996 | Hong | ........................ | 180/446 |
| 5,580,314 A * | 12/1996 | Moriyama et al. | .......... | 464/162 |
| 5,836,821 A * | 11/1998 | Yamada et al. | ............... | 464/89 |
| 5,878,832 A * | 3/1999 | Olgren et al. | ............... | 180/444 |
| 5,946,977 A * | 9/1999 | Sato et al. | ..................... | 74/492 |
| 6,099,036 A * | 8/2000 | Fujiu et al. | .................. | 280/777 |
| 6,378,647 B1 * | 4/2002 | Birsching et al. | ........... | 180/444 |
| 6,662,897 B1 * | 12/2003 | Tatewaki et al. | ............. | 180/444 |
| 6,782,967 B1 * | 8/2004 | Schafert et al. | ............. | 180/444 |
| 6,848,535 B1 * | 2/2005 | Yamamori et al. | .......... | 180/444 |

FOREIGN PATENT DOCUMENTS

| | | |
|---|---|---|
| JP | 2000-211541 | 8/2000 |
| JP | 2001-030921 | 2/2001 |

* cited by examiner

*Primary Examiner*—Lesley D. Morris
*Assistant Examiner*—L. Lum
(74) *Attorney, Agent, or Firm*—Oblon, Spivak, McClelland, Maier & Neustadt, P.C.

(57) ABSTRACT

A transfer ratio varying apparatus includes: a steering shaft configured to transmit a steering angle, an actuator connected to the steering shaft and a damper disposed between the input shaft and the steering shaft and configured to absorb vibration caused by the actuator. The actuator includes: a housing, an input shaft configured to integrally rotate with the housing and connected to the steering shaft, a motor including a rotatable shaft, an output shaft configured to transmit an angle to a wheel assembly, and a gear mechanism between the rotatable shaft and the output shaft at the housing, configured to adjust a rotational angle of the rotatable shaft and to output the adjusted rotational angle to the output shaft.

16 Claims, 5 Drawing Sheets

TRANSFER RATIO VARYING APPARATUS

CROSS REFERENCE TO RELATED APPLICATIONS

This application is based on and claims priority under 35 U.S.C. §119 with respect to Japanese Patent Application 2002-314760, filed on Oct. 29, 2002, the entire contents of which are incorporated herein by reference.

BACKGROUND OF THE INVENTION

1. Field of the Invention

This invention generally relates to a transfer ratio varying apparatus capable of varying a transfer ratio between a steering angle of a steering wheel and an angle of a wheel assembly, where the wheel assembly includes wheels and an axle connecting the wheels.

2. Description of the Related Art

Conventionally, a transfer ratio varying apparatus is described in Japanese patent Laid-Open Publication No. 2000-211541. The transfer ratio varying apparatus includes a steering shaft for transmitting a steering angle of a steering wheel, and an actuator connected to the steering shaft. The actuator includes a housing, an input shaft positioned for integral rotation with the housing and connected to the steering shaft, a motor fixed in the housing and including a shaft that is rotatable (hereafter "motor shaft"), an output shaft rotatably supported by the housing and transmitting an angle to a wheel assembly, where the wheel assembly includes wheels and an axle connecting the wheels, and a gear mechanism disposed between the motor shaft and the output shaft in the housing and increasing or decreasing a rotational angle of the motor shaft. The increased or decreased rotational angle of the rotary shaft is outputted to the output shaft.

Normally, the wheel assembly can receive the angle which was generated by a variable transfer ratio relative to the steering angle of the steering wheel. However, in times of emergency, such as a malfunction of an electronic control unit (ECU), the input shaft of the actuator and the motor shaft can lock up, thereby disabling variance of the transfer ratio.

In the meantime, another Japanese Patent Laid-Open Publication No. 2001-30921 describes a steering apparatus including a damper. This steering apparatus includes a flexible coupling, a first steering shaft connected to one side of the flexible coupling, a second steering shaft connected to an opposite side of the flexible coupling, and a stopper plate attached to the flexible coupling for restraining relative displacement in a torsion direction of the first and second steering shafts. The stopper plate is firmly fixed with a mass, which is a damper. The damper includes a solid metal body coated with a rubber outer layer.

According to the steering apparatus with the aforementioned structure, vibration, which may occur upon steering the steering wheel, can be absorbed by the damper, thereby leading to a reduction of in-vehicle noise. However, in the structure of Japanese Patent Laid-Open Publication No. 2001-30921, it is necessary to have two steering shafts, which is undesirable.

When the above-described transfer ratio varying apparatus was actually mounted on a vehicle, it became obvious that in-vehicle noise is caused due to vibration of the steering wheel. In order to overcome this drawback, it may be preferable that the transfer ratio varying apparatus possesses substantially similar structure as the above-described steering apparatus. That is, the steering shaft of the transfer ratio varying apparatus is divided between first and second steering shafts with a flexible coupling therebetween, where the damper can be firmly fixed with a stopper plate attached to the flexible coupling.

However, the inventors of the present invention experimentally verified that vibration of the steering wheel arises from the rotation of the motor shaft. More particularly, vibration along the motor shaft rotation becomes vibration of the actuator. The actuator vibration is transmitted to the steering wheel via the steering shaft. Therefore, even if the damper is disposed between the first and second steering shafts, the vibration caused due to the motor shaft rotation may be amplified via the first and second steering shafts, which are relatively long. As a result, still some concerns may remain that the in-vehicle noise is not sufficiently reduced.

In light of foregoing, a need thus exists for providing an improved transfer ratio varying apparatus capable of effectively reducing in-vehicle noise.

SUMMARY OF THE INVENTION

According to one aspect of the present invention, a transfer ratio varying apparatus includes a steering shaft configured to transmit a steering angle of a steering wheel, and an actuator connected to the steering shaft. The actuator includes a housing, an input shaft disposed to integrally rotate with the housing and is connected to the steering shaft, a motor fixed in the housing and including a rotatable shaft, an output shaft supported by the housing for its rotation and configured to transmit an angle to a wheel assembly, and a gear mechanism disposed between the shaft of the motor and the output shaft in the housing. The gear mechanism is configured to increase or decrease a rotational angle of the shaft of the motor and to output the increased or decreased rotational angle to the output shaft, wherein a transfer ratio between the steering angle and the angle of the wheel assembly is varied. The apparatus further includes a damper disposed between the input shaft of the actuator and the steering shaft for absorbing vibration caused by the actuator.

It is preferable that the apparatus further includes a flexible coupling configured to connect the input shaft of the actuator and the steering shaft. In this case, the damper can be disposed in the flexible coupling.

Further, it is preferable that the flexible coupling includes a first yoke fixed to the steering shaft and defining the maximum outer diameter of the flexible coupling, a coupling main body made of at least an elastic member being elastic in a radial direction thereof and fixed to the first yoke by a first bolt extending along an axis of the first yoke, and a second yoke fixed to the coupling main body by a second bolt extending along an axis of the second yoke and fixed to the input shaft. In this case, the damper can be fixed to the first yoke by the first bolt.

BRIEF DESCRIPTION OF THE DRAWING FIGURES

The foregoing and additional features and characteristics of the present invention will become more apparent from the following detailed description considered with reference to the accompanying drawing figures, wherein.

DETAILED DESCRIPTION OF THE INVENTION

In addition to a first embodiment of the present invention, non-limiting examples, experiments 1 and 2, will be described hereinbelow in detail with reference to the accompanying drawings.

Figure 1:
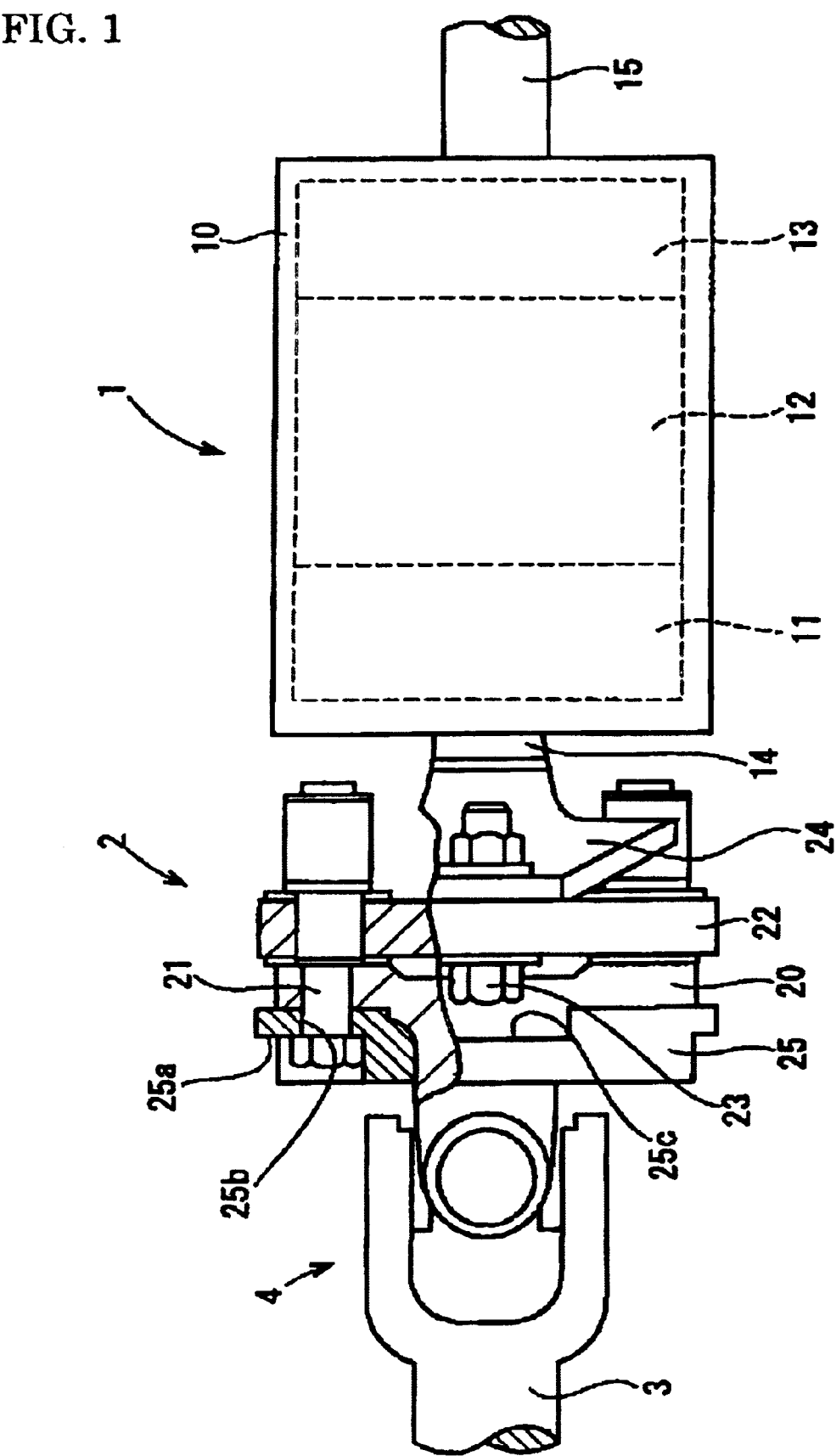
FIG. 1 is a view illustrating a transfer ratio varying apparatus including a partial cross-sectional view of a flexible coupling thereof according to an embodiment of the present invention.

As illustrated in FIG. 1, a transfer ratio varying apparatus according to a first embodiment of the present invention is operatively connected to a steering wheel (not illustrated). The transfer ratio varying apparatus includes a steering shaft 3 for transmitting a steered angle of the steering wheel, an actuator for increasing or decreasing a torsion angle of the steering shaft 3, a flexible coupling 2 for connecting the steering shaft 3 and the actuator 1 via a universal joint 4. The steering shaft 3 may also be referred to as a column shaft.

The actuator 1 includes an input shaft 14, a spiral cable assembly 11, a motor 12, a gear mechanism 13, and an output shaft 15. The spiral cable assembly 11, the motor 12, and the gear mechanism 13 are housed in the housing 10. One end of the input shaft 14 is connected to the flexible coupling 2 and the other end thereof is operatively connected to the housing 10 for integral rotation. The spiral cable assembly 11 connects the motor 12 and an exterior thereof via a flexible flat cable. The motor 12 (fixed in the housing 10) is provided with a shaft that is configured to rotate based upon a command from an electronic control unit (ECU) (not illustrated). Hereinafter, the shaft of the motor is referred to as a motor shaft. A rotational angle of the motor shaft is increased or decreased by the gear mechanism 13, and is outputted to the output shaft 15. The output shaft 15 is connected to the housing 10 to transmit the output from the gear mechanism 13 as an angle to a driven wheel assembly. For example, when the vehicle is a front wheel drive type vehicle, the wheel assembly includes front wheels and a driven axle connecting the front wheels. When the vehicle is a rear wheel drive type vehicle, the wheel assembly includes rear wheels and a driven axle connecting the rear wheels. Hereinafter, the angle of the wheel assembly is referred to as a wheel angle.

The flexible coupling 2 is configured with a first yoke 20, a coupling main body 22, a second yoke 24, and a damper 25. The first yoke 20 and the second yoke 24 may be made of metal, as a non-limiting example. The steering shaft 3 acts as an input side of the universal joint 4, and the first yoke 20 of the flexible coupling 2 acts as an output side of the universal joint 4. The coupling main body 22 may be made of, for example, an elastic member such as rubber or the like and may be disc-shaped. The first yoke 20 and the damper 25 are both fastened to the coupling main body 22 by two first fastening devices 21. A non-limiting example of the first fastening device includes bolts or the like. The first bolts 21 are substantially symmetrically arranged relative to a center of the coupling main body 22 and extend substantially in a vertical manner relative to a cross section of an axis of the coupling main body 22. The second yoke 24 is formed integrally with the input shaft 14 and is fixed to the coupling main body 22 by use of two second fastening devices 23. One non-limiting example for the second fastening devices is bolts or the like. The second bolts 23 are substantially symmetrically arranged relative to the center of the coupling main body 22 and extend substantially in the vertical manner relative to the cross section of the axis of the coupling main body 22. A line extending between central portions of the first bolts 21 intersects at substantially right angles with a line extending between central portions of the second bolts 23 along the cross section of the axis of the coupling main body 22.

Figure 2:
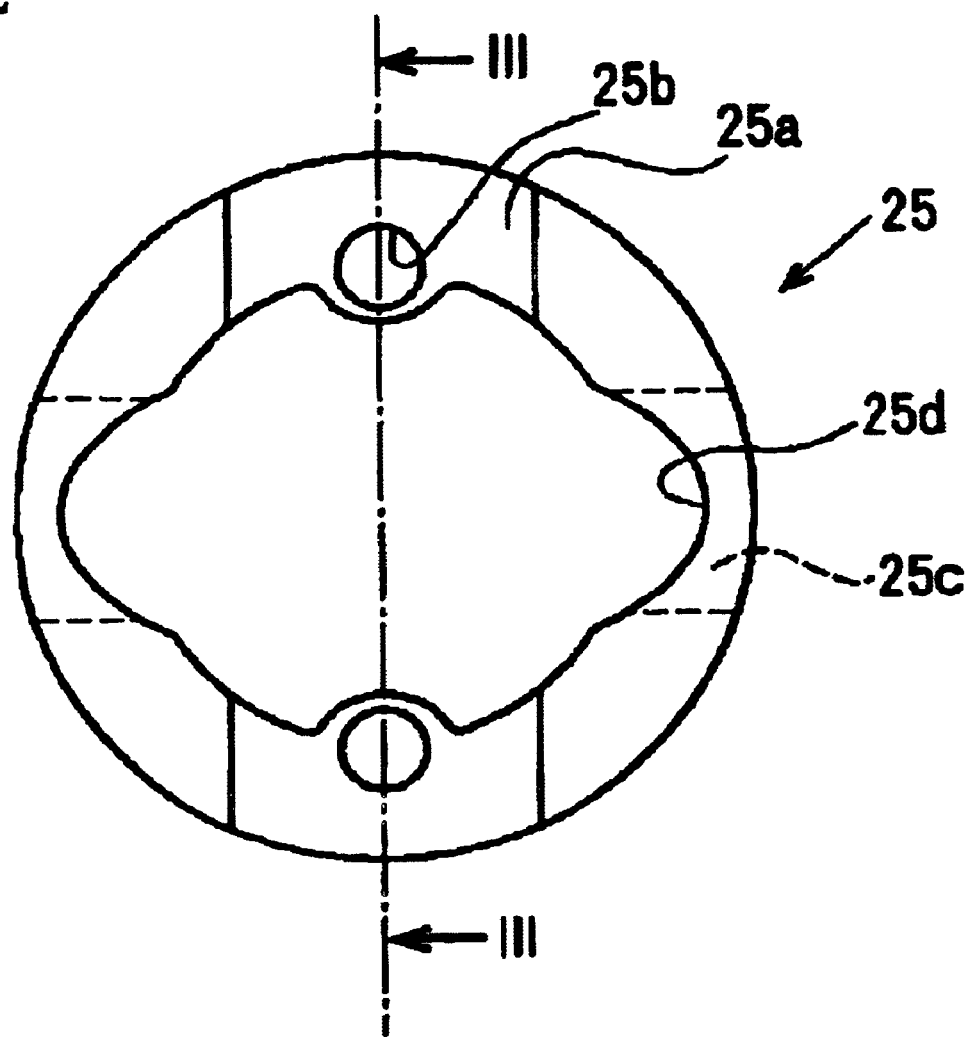
FIG. 2 is a plan view illustrating a damper disposed in the flexible coupling illustrated in FIG. 1.
Figure 3:
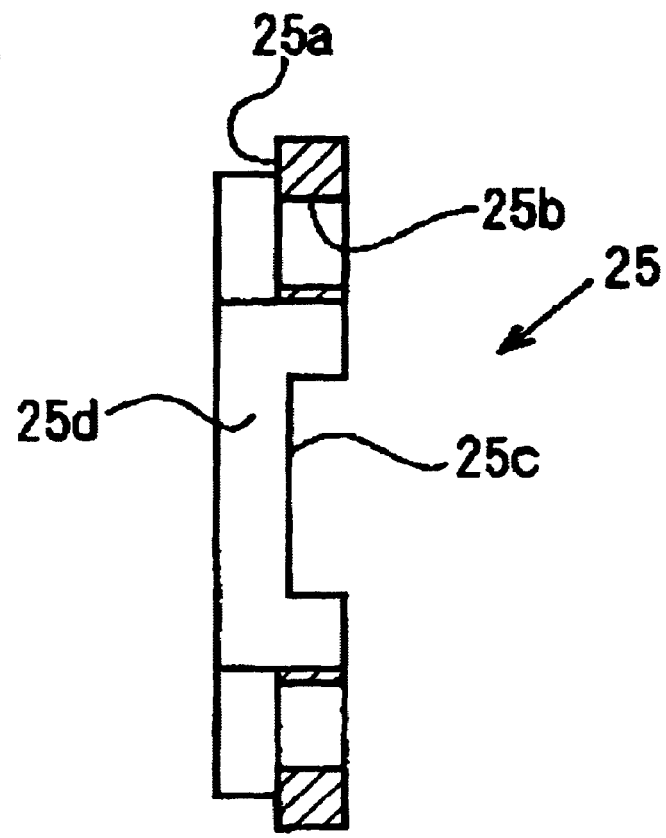
FIG. 3 is a cross-sectional view of the damper taken along the line III—III in FIG. 2.

As illustrated in FIGS. 2 and 3, the damper 25 has a ring-shaped structure. The damper 25 may be made of metal, as a non-limiting example. Two recessed surfaces 25a are defined at one surface of the damper 25 at a side of the steering shaft 3 and are substantially symmetrically arranged relative to an axis of the damper 25. Each recessed surface 25a includes a through hole 25b for penetrating the first fastening device 21. Meanwhile, two recessed surfaces 25c are defined at the other surface of the damper 25 at a side of the first yoke 20 and are substantially symmetrically arranged relative to the axis of the damper 25. A line extending between central portions of the two recessed surfaces 25a intersects at substantially right angles with a line extending between central portions of the two recessed surfaces 25c. A recessed portion 25d is defined to go through the recessed surfaces 25c and to recess in a radially outward direction of the damper 25. Therefore, the second bolts 23 may be effectively prevented from contacting with the damper 25.

According to the transfer ratio varying apparatus with the above-described structure, the steering shaft 3 and the input shaft 14 of the actuator 1 are connected to each other via the flexible coupling 2. The damper 25 is disposed in the flexible coupling 2. For example, according to the first embodiment of the present invention, the damper 25 is disposed at a vicinity of or in contact with the first yoke 20 of the flexible coupling 2. That is, the damper 25 may be disposed adjacent to the actuator 1. Therefore, vibration along with the rotation of the motor shaft can be effectively attenuated immediately after being outputted from the actuator 1.

Further, the vibration of the actuator 1 mostly arises from the rotation of the motor shaft. Therefore, the vibration of the actuator 1 may contain vibration amplitude along a circumferential direction of the input shaft 14. The vibration amplitude can be attenuated more effectively in response to increase of a turning radius of the damper 25, thereby enabling reduction of in-vehicle noise more effectively. However, the turning radius of the damper 25 is limited up to a certain level such that the damper 25 can be effectively prevented from osculating with exterior portions such as a column cover.

In light of this, the damper 25 is provided at the first yoke 20 such that the maximum turning radius of the damper 25 can be defined to be approximately equal to a radius of the coupling main body 22. In the foregoing manners, the vibration of the actuator 1 can be effectively absorbed by the transfer ratio varying apparatus according to the embodiment of the present invention. As a result, the in-vehicle noise can be effectively reduced.

In terms of cost, the steering shaft 3 is not required to be divided, since the damper 25 can be disposed adjacent to the actuator 1. This can lead to reducing manufacturing cost of the apparatus. Further, the damper 25 may be made of a metal having a constant mass such that the damper 25 can be manufactured at a moderate price and can be easily assembled. Still further, the damper 25 and the first yoke 20 can both be fixed to the coupling main body 22 together, thereby enabling better assembling performance and reduced manufacturing costs of the apparatus.

(Experiment 1)

Figure 4:
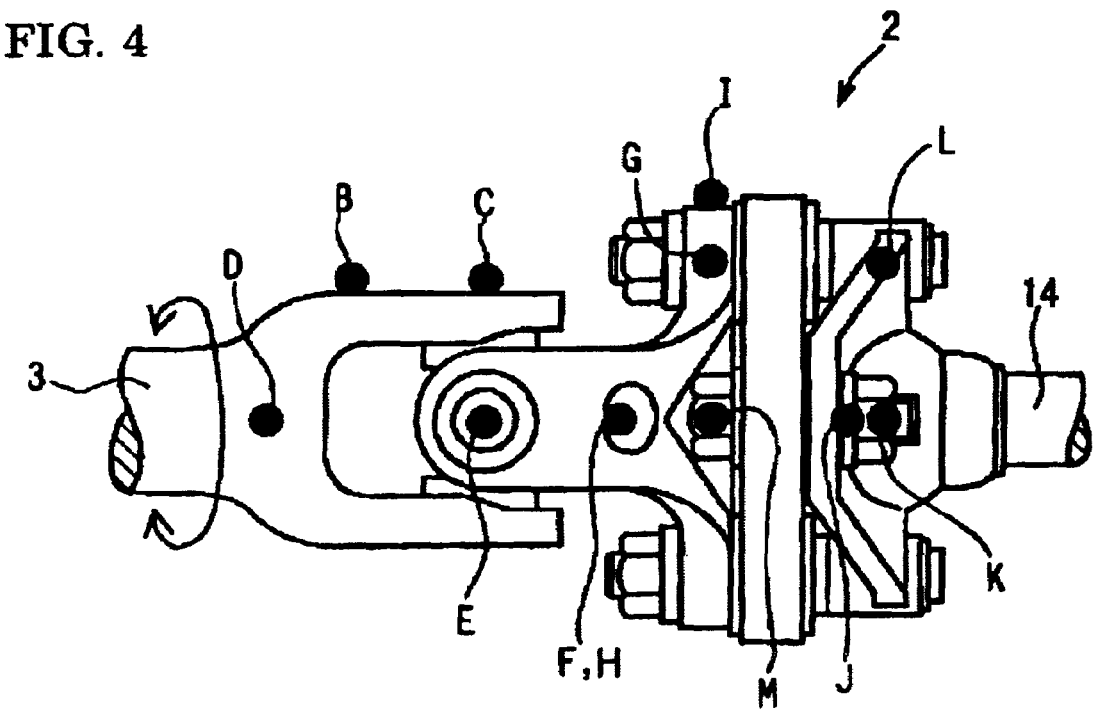
FIG. 4 is a view illustrating the flexible coupling and a steering shaft for explaining experimentally assembled portion of the damper.

This experiment 1 verifies absorbing ability of the damper for absorbing the vibration of the actuator depending upon an assembled position of the damper. More particularly, this experiment estimates damping force characteristics for damping vibration acceleration (db-G) at the frequency bands $\alpha$ and $\beta$ by measuring the vibration acceleration along with the steering direction of the steering shaft 3 illustrated in FIG. 4 by an arrow. Since vibration of the steering shaft at the frequency bands $\alpha$ and $\beta$ is highly related to in-vehicle noise caused when the actuator is actually mounted on a vehicle, this experiment is preferably performed while the actuator is activated under substantially the same conditions as when actually mounted on the vehicle. In this case, two nuts (such as type M16) are sequentially attached to portions denoted with reference letters B through M and respective rotational symmetrical portions thereof.

Figure 5:
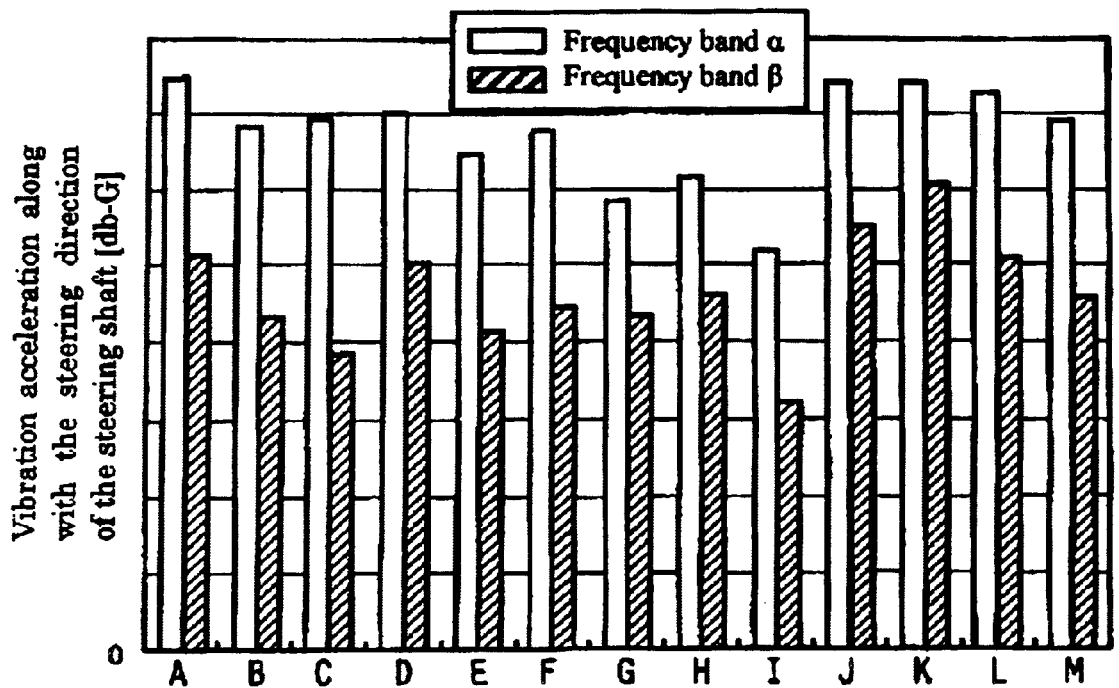
FIG. 5 is a graph for explaining damping force characteristics regarding each assembled portion of the damper in FIG. 4 according to the embodiment of the present invention.

Damping vibration acceleration at each portion was experimentally verified as shown in FIG. 5. Bar graphs of reference letter A denote the damping vibration acceleration measured when the nuts were not adhered at any portions of the transfer ratio varying apparatus. The positions denoted with the reference letters F and H are actually the same position. In other words, the nut at the position F is located substantially at the same place as the nut at the position H. However, the nut at the position F is attached in a different direction from the nut at the position H.

As explained by FIG. 5, the portion of the apparatus denoted with the reference letter I is estimated to possess the highest damping performance among the other experimented portions of the apparatus. Therefore, it would be most effective to dispose the damper at the portion denoted with the reference letter I. However, the portion denoted with the reference letter I actually corresponds to an outer periphery of the first yoke 20. If the damper 25 were disposed at the position I, it may be difficult to assemble the column cover. In light of foregoing, the portion of the apparatus denoted with the reference letter G is estimated to possess fairly high damping performance to absorb the vibration at both frequency bands $\alpha$ and $\beta$ (next to the position I). Therefore, it would be optimal to assemble the damper at the position G.

(Experiment 2)

This experiment 2 verified a degree of a sound pressure (db-A) which may be applied to a driver's ears by the above-described transfer ratio varying apparatus.

Figure 6:
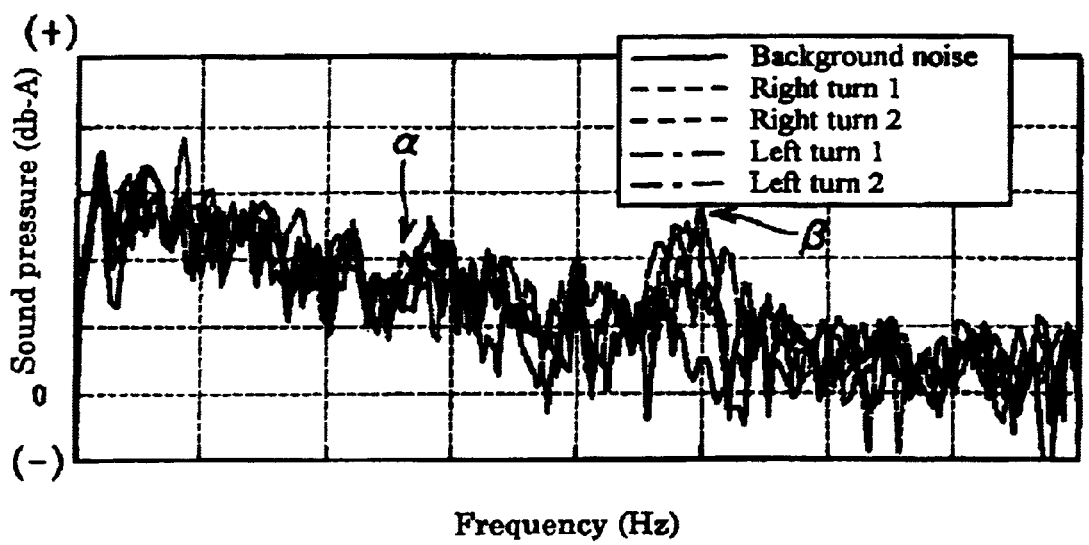
FIG. 6 is a graph for explaining sound pressure caused by the transfer ratio varying apparatus which is removed with the damper.

As a first step, the experiment estimated a degree of the sound pressure which may be applied to the driver's ears when the damper was removed from the apparatus. With reference to FIG. 6, "Background noise" corresponds to a sound pressure generated during the steering wheel maintained at an original position without being steered. Sound pressure denoted with "Right turn 1" and "Right turn 2" correspond to sound pressure during turning the steering wheel in a right turning direction, respectively. The steering wheel was turned twice in the right turning direction, i.e. in a clockwise direction. In the meantime, sound pressure denoted with "left turn 1" and "left turn 2" correspond to sound pressure during turning the steering wheel in a left turning direction, respectively. The steering wheel was turned twice in the left turning direction, i.e. in a counterclockwise direction.

Figure 7:
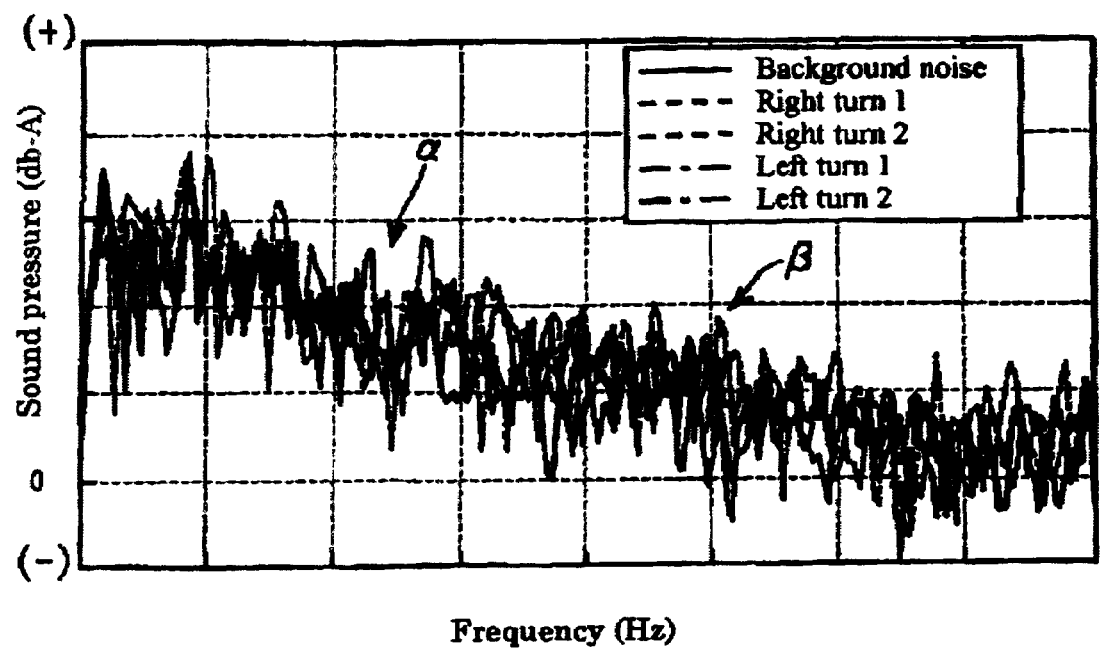
FIG. 7 is a graph for explaining the sound pressure caused by the transfer ratio varying apparatus which disposes the damper therein.
Figure 8:
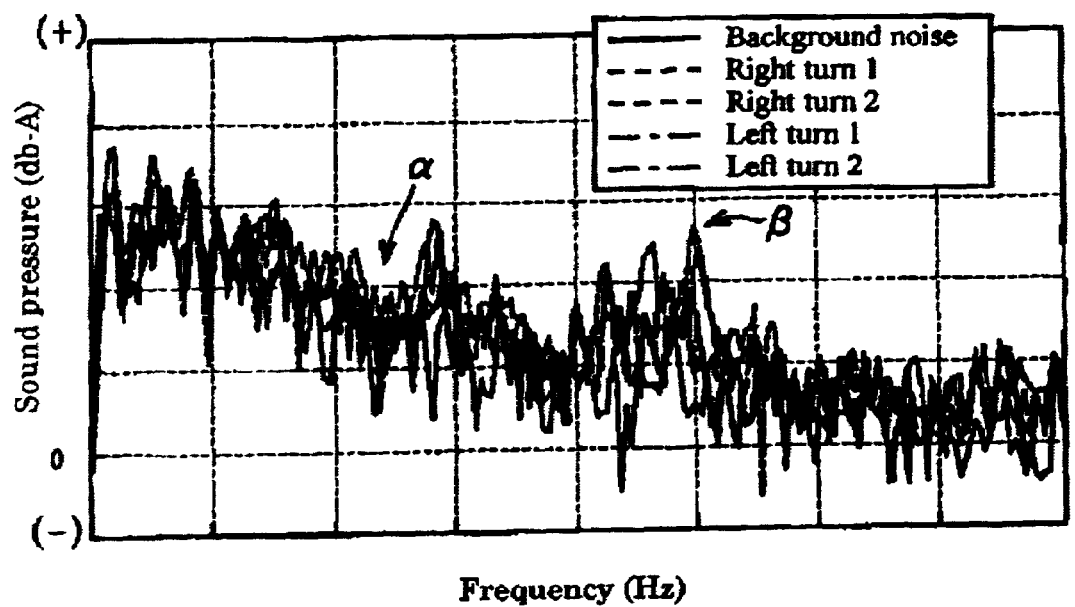
FIG. 8 is a graph for explaining the sound pressure caused by the transfer ratio varying apparatus which is removed with the damper after the experiment for majoring the sound pressure caused by the apparatus provided with the damper.

Secondarily, the experiment estimated a degree of the sound pressure to be applied to the driver's ears when the damper is assembled in the apparatus. The experimental result is shown in FIG. 7. Further, the experiment estimated a degree of the sound pressure which may be applied to the driver's ears by removing the damper from the apparatus once again. The experimental result is also shown in FIG. 8.

With reference to FIGS. 6 and 7, the sound pressure is reduced around the frequency band $\beta$ when the damper is disposed in the transfer ratio varying apparatus. When the damper is removed from the apparatus again, the sound pressure results substantially in the same manner as shown in FIG. 6. As described above, this experiment clearly verifies that the sound pressure is reduced around the frequency band $\beta$. Therefore, according to the transfer ratio verifying apparatus according to the embodiment of the present invention, in-vehicle noise can be effectively reduced at a moderate price.

The principles, preferred embodiment and mode of operation of the present invention have been described in the foregoing specification and drawings. However, the invention which is intended to be protected is not to be construed as limited to the particular embodiment disclosed. Further, the embodiment described herein is to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A transfer ratio varying apparatus for a vehicle, comprising:
   an actuator including an input shaft that rotates with a housing;
   a steering shaft configured to transmit a steering angle of a steering wheel;
   a damper positioned at the steering shaft to absorb vibration caused by the actuator; and
   a flexible coupling configured to connect an input part of the actuator and the steering shaft, wherein the damper is positioned at the flexible coupling, wherein the flexible coupling comprises:
   a first yoke fixed at the steering shaft;
   a coupling main body including an elastic member and fixed to the first yoke by a first fastener extending along an axis of the first yoke; and
   a second yoke fixed at the coupling main body by a second fastener extending along an axis of the second yoke and fixed at the input part, wherein the damper is fixed to the first yoke by the first fastener.

2. A transfer ratio varying apparatus for a vehicle, comprising an actuator, a steering shaft configured to transmit a steering angle of a steering wheel, and a damper positioned at the steering shaft to absorb vibration caused by the actuator, wherein the actuator comprises:
a housing;
an input shaft configured to rotate with the housing and connected at the steering shaft;
a motor fixed at the housing;
an output shaft positioned at the housing and configured to transmit the steering angle to ground wheels; and
a gear mechanism configured to adjust a rotational angle of a shaft of the motor and to output the adjusted rotational angle to the output shaft.

3. The apparatus according to claim 1, wherein at least one of the first and second fasteners includes a bolt.

4. The apparatus according to claim 1, wherein the coupling main body is composed at least in part of a rubber.

5. A transfer ratio varying apparatus for a vehicle, comprising:
an actuator including an input shaft that rotates with a housing;
a steering shaft configured to transmit a steering angle of a steering wheel;
a damper positioned at the steering shaft to absorb vibration caused by the actuator; and
a flexible coupling configured to connect an input part of the actuator and the steering shaft, wherein the damper is positioned at the flexible coupling, wherein the damper is composed at least in part of a metal.

6. A transfer ratio varying apparatus, comprising:
a steering shaft configured to transmit a steering angle of a steering wheel;
an actuator connected to the steering shaft, the actuator comprising, a housing, an input shaft configured to integrally rotate with the housing and connected to the steering shaft, a motor fixed at the housing and including a rotatable shaft, an output shaft supported at the housing and configured to transmit an angle to a wheel assembly, and a gear mechanism between the rotatable shaft and the output shaft at the housing, configured to adjust a rotational angle of the rotatable shaft and to output the adjusted rotational angle to the output shaft; and
a damper disposed between the input shaft and the steering shaft and configured to absorb vibration caused by the actuator.

7. The transfer ratio varying apparatus according to claim 6, further comprising:
a flexible coupling configured to connect the input shaft of the actuator and the steering shaft, wherein the damper is positioned at the flexible coupling.

8. The transfer ratio varying apparatus according to claim 7, wherein the flexible coupling comprises:
a first yoke fixed at the steering shaft and defining a maximum outer diameter of the flexible coupling;
a coupling main body including at least an elastic member being elastic in a radial direction thereof and fixed with the first yoke by a first fastener extending along an axis of the first yoke; and
a second yoke fixed with the coupling main body by a second fastener extending along an axis of the second yoke and fixed to the input shaft, wherein the damper is fixed to the first yoke by the first fastener.

9. The transfer ratio varying apparatus according to claim 8, wherein the coupling main body is made at least in part of rubber.

10. The transfer ratio varying apparatus according to claim 8, wherein at least one of the first fastener and the second fastener includes a bolt.

11. The transfer ratio varying apparatus according to claim 6, wherein the damper is made at least in part of a metal having a constant mass.

12. A transfer ratio varying apparatus for a vehicle, comprising:
means for actuating, including an input shaft that rotates with a housing;
means for transmitting a steering angle of a steering wheel;
means for damping, positioned at the means for transmitting to absorb vibration caused by the means for actuating; and
means for flexibly coupling connecting an input part of the means for actuating and the means for transmitting, wherein the means for damping is positioned at the means for flexibly coupling, wherein the means for flexibly coupling comprises:
a first yoke fixed at the means for transmitting;
a coupling main body including an elastic member and fixed to the first yoke by a first means for fastening extending along an axis of the first yoke; and
a second yoke fixed at the coupling main body by a second means for fastening extending along an axis of the second yoke and fixed at the input part,
wherein the means for damping is fixed to the first yoke by the first means for fastening.

13. A transfer ratio varying apparatus for a vehicle, comprising means for actuating, means for transmitting a steering angle of a steering wheel, and means for damping, positioned at the means for transmitting to absorb vibration caused by the means for actuating, wherein the means for actuating comprises:
a housing;
an input shaft configured to rotate with the housing and connected at the steering shaft;
a motor fixed at the housing;
an output shaft positioned at the housing and configured to transmit the steering angle to ground wheels; and
a gear mechanism configured to adjust a rotational angle of a shaft of the motor and to output the adjusted rotational angle to the output shaft.

14. The apparatus according to claim 12, wherein at least one of the first and second means for fastening includes a bolt.

15. The apparatus according to claim 12, wherein the coupling main body is composed at least in part of a rubber.

16. A transfer ratio varying apparatus for vehicle, comprising:
means for actuating, including an input shaft that rotates with a housing;
means for transmitting a steering angle of a steering wheel;
means for damping, positioned at the means for transmitting to absorb vibration caused by the means for actuating; and
means for flexibly coupling connecting an input part of the means for actuating and the means for transmitting, wherein the means for damping is positioned at the means for flexibly coupling, wherein the means for damping is composed at least in part of a metal.

* * * * *